US009585189B1

(12) United States Patent  
Rastas

(10) Patent No.: US 9,585,189 B1  
(45) Date of Patent: Feb. 28, 2017

(54) REJECTING OR ACCEPTING A PHONE CALL USING A LAG TIME

(71) Applicant: Microsoft Technology Licensing, LLC, Redmond, WA (US)

(72) Inventor: Johannes Rastas, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/886,355

(22) Filed: Oct. 19, 2015

(51) Int. Cl.
| G06F 15/16 | (2006.01) |
| H04W 76/04 | (2009.01) |
| H04M 3/428 | (2006.01) |
| H04M 1/725 | (2006.01) |
| H04W 4/16 | (2009.01) |

(52) U.S. Cl.
CPC ....... *H04W 76/04* (2013.01); *H04M 1/72583* (2013.01); *H04M 3/4283* (2013.01); *H04W 4/16* (2013.01)

(58) Field of Classification Search
CPC ...... H04W 4/00; H04W 76/025; H04W 84/04
USPC ................ 455/412.1, 412.2, 413, 414.1, 415
See application file for complete search history.

(56) References Cited

U.S. PATENT DOCUMENTS

| 6,339,706 | B1 | 1/2002 | Tillgren et al. |
| 8,577,644 | B1 | 11/2013 | Ksondzyk et al. |
| 8,600,450 | B2 | 12/2013 | Bengtsson et al. |
| 8,964,959 | B2 | 2/2015 | Tsui |
| 2010/0067723 | A1 | 3/2010 | Bergmann et al. |
| 2010/0222028 | A1* | 9/2010 | Gisby ..................... H04M 1/57 455/412.2 |
| 2013/0040662 | A1 | 2/2013 | Elisco |
| 2013/0227454 | A1 | 8/2013 | Thorsander et al. |
| 2014/0045547 | A1 | 2/2014 | Singamsetty et al. |
| 2014/0118465 | A1 | 5/2014 | Scott et al. |

OTHER PUBLICATIONS

"Smart Call Accept", Jun. 16, 2015 Available at: https://play.google.com/store/apps/details?id=com.dungelin.smartcallaccept&hl=en.
Lakshmin, Deepa, "Tinder's Upcoming 'Undo' Button Will Fix All Your Accidental Left Swipes", Published on: Nov. 4, 2014 Available at: http://www.mtv.com/news/1986967/tinder-undo-button/.
"Block or ignore someone", Published on: Nov. 16, 2013 Available at: https://support.google.com/hangouts/answer/2945109?hl=en.
Tan, Kay, "iOS 7: 31 Tips, Tricks and New Features You Should Know", Published on: Sep. 21, 2013 Available at: http://www.hongkiat.com/blog/ios-7-tips-tricks-features/.

(Continued)

*Primary Examiner* — Sam Bhattacharya
(74) *Attorney, Agent, or Firm* — Judy Yee; Micky Minhas

(57) ABSTRACT

In an embodiment, rejecting or accepting a phone call is disclosed. In an embodiment, a device is disclosed. The device comprises a processor, a storage comprising a set of instructions, wherein the set of instructions, when executed by the processor, causes the device to in response to received call present at a user interface of the device a first option and a second option of the call. In response to a first selection between the first option and the second option, the device initiates a lag time of pre-determined length before performing the first selection; and in response to a second selection between the first option and the second option, performs the second selection.

20 Claims, 7 Drawing Sheets

(56) References Cited

OTHER PUBLICATIONS

Georgia, "How to shake-to-undo Typing, Deleting, Cutting, Pasting, and more on iPhone", Published on: May 17, 2011 Available at: http://www.imore.com/daily-tip-undo-typing-deleting-cutting-pasting-iphone.
"Method and System for Improving Mobile Telephone Caller Identification", In Proceedings of the International Business Machines Corporation, Research Disclosure, vol. 451, Issue 128, 2 Pages.
"International Search Report and Written Opinion Issued in PCT Application No. PCT/US2016/056527", Mailed Date: Dec. 16, 2016, 11 Pages.

* cited by examiner

REJECTING OR ACCEPTING A PHONE CALL USING A LAG TIME

BACKGROUND

In apparatuses for performing phone calls, a user interface is used for rejecting or accepting an incoming phone call. The phone calls can be accepted or rejected by touching the touch-sensitive display in a pre-determined manner. In some apparatuses, it is possible to accept or reject a phone call through a natural user interface (NUI), optionally without touching the device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, rejecting or accepting a phone call is disclosed. In an embodiment, a device is disclosed. The device comprises a processor, a storage comprising a set of instructions, wherein the set of instructions, when executed by the processor, causes the device to in response to received incoming call present at a user interface of the device a first option and a second option of the call. In response to a first selection between the first option and the second option, the device initiates a lag time of pre-determined length before performing the first selection; and in response to a second selection between the first option and the second option, performs the second selection.

In other embodiments, a mobile device and a method are discussed along with the features of the device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiment may be constructed or utilized. However, the same or equivalent functions and sequences may be accomplished by different embodiments.

Although the present embodiments may be described and illustrated herein as being implemented in a smartphone, this is only an example of a mobile device and not a limitation. As those skilled in the art will appreciate, the present examples are suitable for application in a variety of different types of mobile devices or hand-held mobile devices, for example, in mobile phones, tablet computers, phablets, netbook computers, laptop computers, desktop computers, processor-enabled televisions, personal digital assistants (PDAs), touchscreen devices connected to any of the preceding devices, or any other computing device that has a touchscreen and is enabled to process phone calls.

Figure 1:
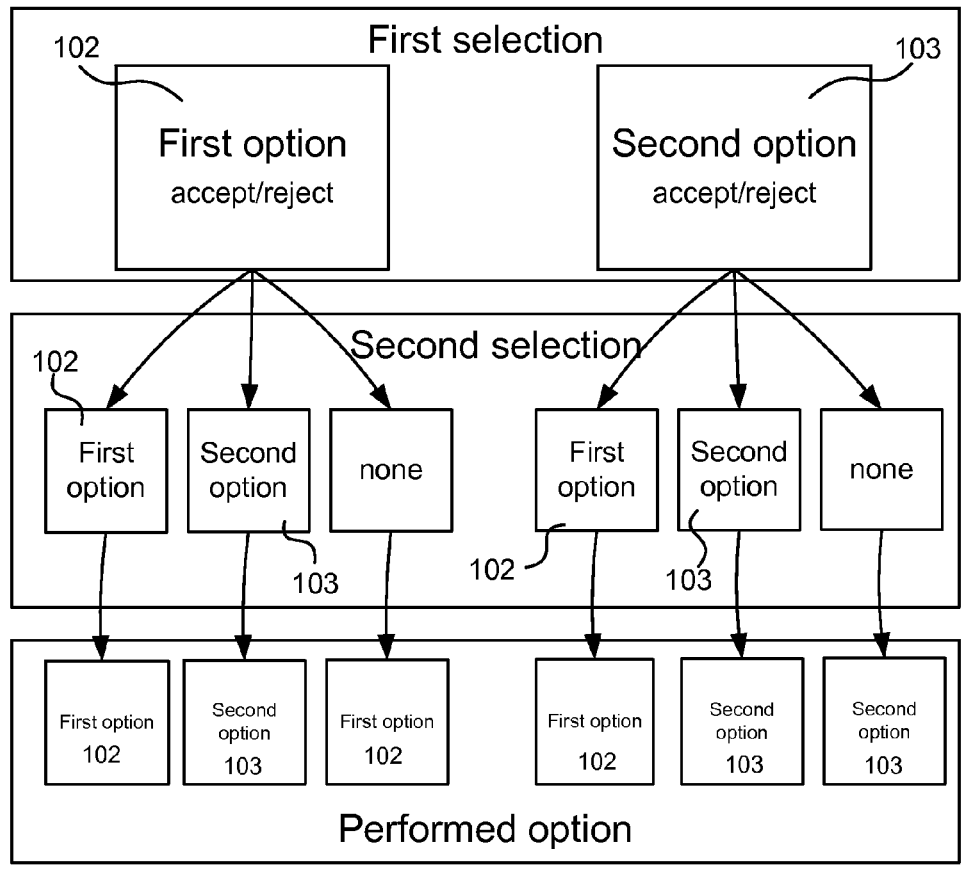
FIG. 1 illustrates an embodiment of a mobile device showing a block diagram of a functionality of the device in a schematic form.

FIG. 1 illustrates a functional state diagram of an embodiment of the mobile device 100. According to an embodiment, the mobile device 100 allows the user to select between a first option 102 and a second option 103, which are accepting an incoming phone call or rejecting an incoming phone call. The first option 102 might be rejecting an incoming phone call and the second option 103 might be accepting an incoming phone call. Alternatively, the first option 102 might be accepting an incoming phone call and the second option 103 might be rejecting an incoming phone call. The first selection may be the first option 102 or the second option 103. Similarly, the second selection may be the first option 102 or the second option 103. Thus, the second selection may be the same option 102, 103 selected as the first selection. In such a case, the user has the possibility of confirming the option 102, 103 selected first. Alternatively, the second selection may be the other one of the two. In such a case, the user has the chance of changing her selection. Consequently, before the call completion have been terminated or established in the call connection system, such as in a mobile system, there is a possibility to undo the undesired selection without the call being disconnected at the system level. However, it is possible that the second selection is not made, in which case, after the lag time has lapsed, the option 102, 103 according to the first selection is performed, for example, the call is disconnected.

Accordingly, the first selection may be accepting an incoming phone call and the second selection may be rejecting the incoming phone call. The first selection may be rejecting an incoming phone call and the second selection may be accepting the incoming phone call. The first selection may be accepting an incoming phone call and the second selection may be accepting the incoming phone call. The first selection may be rejecting an incoming phone call and the second selection may be rejecting the incoming phone call.

Figure 2:
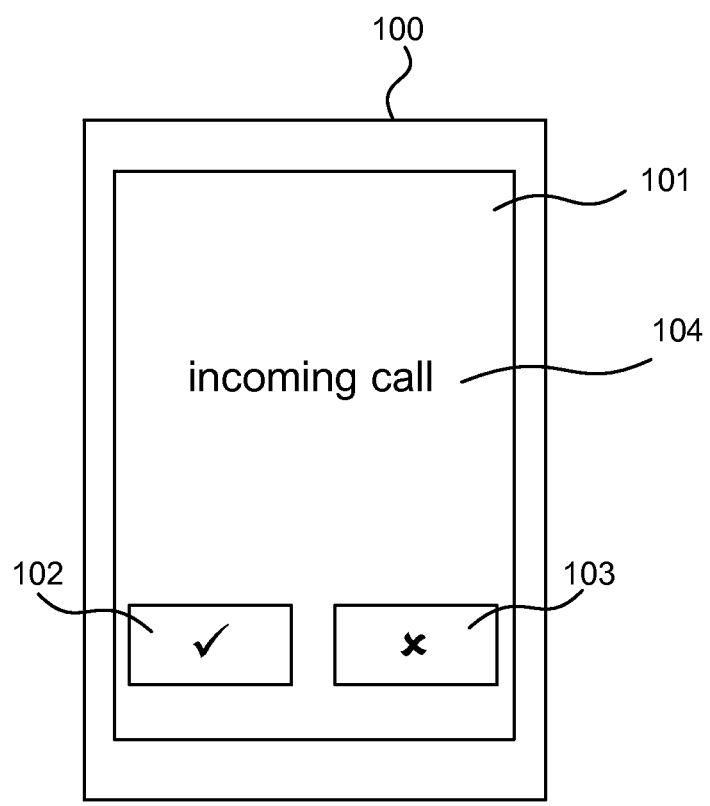
FIG. 2 illustrates an embodiment of a mobile device and a user interface of the mobile device displaying an incoming call.

FIG. 2 illustrates an embodiment of a mobile device 100, illustratively depicted as a smartphone in this embodiment, and a user interface 101 of the mobile device 100 according to the present disclosure. As stated above, while FIG. 2 depicts an example mobile device 100 in the form of a smartphone, other touchscreen-enabled devices processing phone calls may be used equivalently.

An embodiment of the mobile device 100 relates to receiving a phone call. A phone call may be communication through live voice and/or video transmission between two apparatuses. A phone call may be executed over a landline, mobile network, fixed network, satellite connections or any of their combinations. Thus, in addition to public switched telephone network or circuit switched call, a phone call may be an internet protocol or data packet-based call. A phone call may be mobile network based call. It may also or alternatively be a packet or circuit-switched call. Further, a phone call can be executed as a combination of the preceding alternatives.

In an embodiment, the user interface 101 is implemented through a touchscreen. The first selection and the second selection may be actuated through sensitive areas on the touchscreen. The touchscreen may be a touch-sensitive display such as a presence-sensitive screen enabled to detect touch inputs from a user, including gesture touch inputs that include an indication, pointing, a motion with respect to the touch-sensitive display, and translate those touch inputs into corresponding inputs made available to the operating system and/or one or more applications running on the mobile device 100. Various embodiments may include a touch-sensitive screen configured to detect touch, touch gesture inputs, or other types of presence-sensitive screen such as a screen device that reads gesture inputs by visual, acoustic, remote capacitance, or other type of signals, and which may also use pattern recognition software in combination with user input signals to derive program inputs from user input signals.

The mobile device 100 may accept a touch input in the form of a tap input, with a simple touch on a touchscreen without any motion along the surface of, or relative to, the touchscreen. This simple tapping touch input without motion along the surface of the touchscreen may be equivalent and contrasted with a gesture touch input that includes motion with respect to the presence-sensitive screen, or motion along the surface of the touchscreen. The phone call application may detect and distinguish between simple tapping touch inputs and gesture touch inputs on the surface of the touchscreen, as communicated to it by the input detecting aspects of touchscreen, and interpret tapping touch inputs and gesture touch inputs in different ways. Other aspects of input include double-tap; touch-and-hold, then drag; pinch-in and pinch-out, swipe, rotate. Inputs and actions may be attributed to the mobile device 100, throughout embodiments, with the understanding that various aspects of those inputs and actions may be received or performed by touchscreen, the phone call application, the operating system, or any other software or hardware elements of or running on the mobile device 100.

The mobile device 100 may comprise natural user interface, NUI, technology which enables a user to interact with the mobile device 100 in a natural manner, free from artificial constraints imposed by input devices such as mice, keyboards, remote controls and the like. Examples of NUI technology that may be provided include, but are not limited to, those relying on voice and/or speech recognition, touch and/or stylus recognition (touch-sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods). The user interface 101 may be a NUI. The first selection and the second selection may be actuated through a natural user interface.

The mobile device 100 is equipped with a processor (not shown in FIG. 2) and a storage comprising a set of instructions. The mobile device 100 receives an incoming phone call, and the set of instructions is executed by the processor as a response to the incoming call. The mobile device 100 displays an incoming call at the user interface 101, in accordance with an illustrative embodiment. The user interface 101 of the mobile device 100 presents an incoming call indicator 104. The incoming call indicator 104 may be designed in many different ways and only an example is depicted in FIG. 2. The incoming call indicator 104 may comprise, for example, text, a visualization of an incoming call, identity or the telephone number of the caller or a combination thereof.

A first option 102 and a second option 103 are presented at the user interface 101 of the mobile device 100. A first option and a second option may be a choice presented to a user by the mobile device 100, for example it may indicate a desired selection by the user. The user of the mobile device 100 may select the preferred option. A first option may be accepting an incoming phone call. A first option may be rejecting an incoming phone call. Similarly, a second option may be accepting an incoming phone call. A second option may be rejecting an incoming phone call. If the first option is accepting the incoming phone call, the second option is rejecting the phone call, and vice versa. The user interface 101 thus prompts the user to make a first selection, which can be either of the two options. In other words, the user may accept the phone call or the user may reject the phone call.

In the embodiment of FIG. 2, the first option 102 is accepting the incoming phone call and the second option 103 is rejecting the incoming phone call.

A user of the mobile device 100 may perform a first selection between the first option and the second option. Thus, the selection is made by the user. The first selection may be made by the user on purpose or it may be accidental. It is further possible that the first selection is made independently of the user. In case the mobile device 100 is in a confined space, such as pocket, bag, purse or similar, it is possible that the first selection made due to accidental contact with the surrounding material. In such a case, the first selection might deviate from the intention of the user. It is further possible that the user remains unaware of the first selection being made.

If the user unintentionally chooses the wrong option, for example accepts the phone call when the purpose was to reject it or vice versa, it is possible to reverse the selection.

Figure 3:
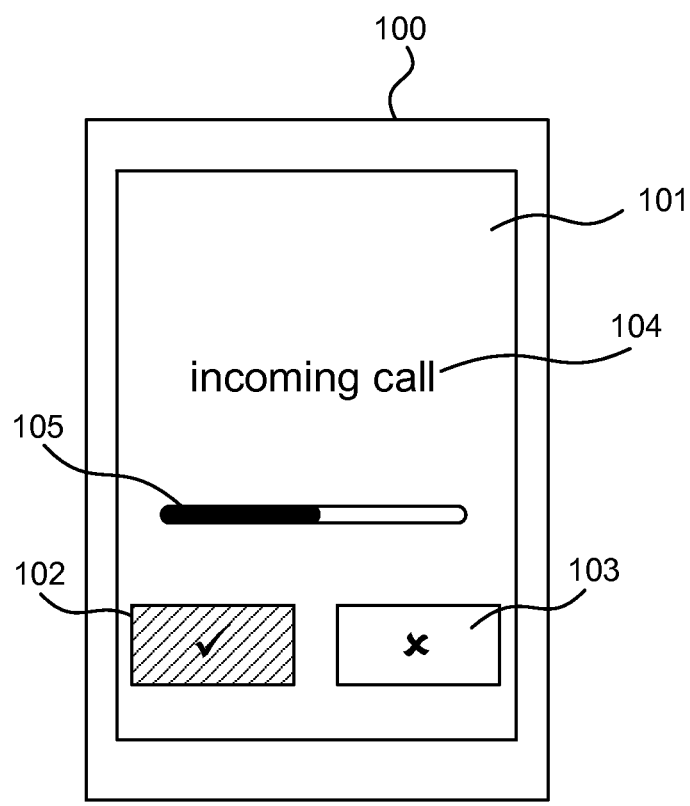
FIG. 3 illustrates a user interface of a mobile device during the lag time after one of the options is selected by the first selection, according to an embodiment.

FIG. 3 depicts a mobile device 100 after the user has made a first selection. In the embodiment of FIG. 3, the selection is the first option 102 of accepting the incoming phone call. The selection is highlighted by hatching.

A mobile device 100, according to the embodiment, is configured to initiate a lag time of a pre-determined length in response to the first selection between the first option and the second option. When the lag time has lapsed, the first selection is performed. If the option of accepting the phone call is the first selection, then, at the end of the lag time or after the end of the lag time, the call will be accepted. If the option of rejecting the phone call is the first selection, then, after the lag time has lapsed, the call will be rejected.

In an embodiment, the pre-determined length of the lag time is 1 to 5 seconds. For example, the length of the lag time may be 4 seconds. In an embodiment, the pre-determined length of the lag time is 1 to 3 seconds. For example, the length of the lag time may be 2.5 seconds. In an embodiment, the pre-determined length of the lag time is 1 to 2 seconds. For example, the length of the lag time may be 1.5 seconds.

According to an embodiment, the remaining lag time may be displayed at the user interface 101. In the embodiment of FIG. 3, the remaining lag time is displayed on a lag time indicator 105. In FIG. 3, the lag time indicator 105 is a bar indicator. However, any intuitive lag time indicator 105 is suitable. For example, an hourglass, rolling circle or the like can be used.

In an embodiment, an option according to the first or the second selection is performed at the end of the lag time. If the mobile device 100 receives a second selection between the first option and the second option during the lag time, the second selection is performed. In an embodiment, the second selection is performed within the lag time. It is possible, but unnecessary, to perform the second selection immediately when the second selection is made. It is a further embodiment that the second selection is performed at the end of the lag time. In such a case, the delay in performing the selection is constant when counted from making the first selection. Yet another embodiment is that a second lag time of pre-determined length is initiated by making the second selection and the second selection is performed at the end of the second lag time.

Figure 4:
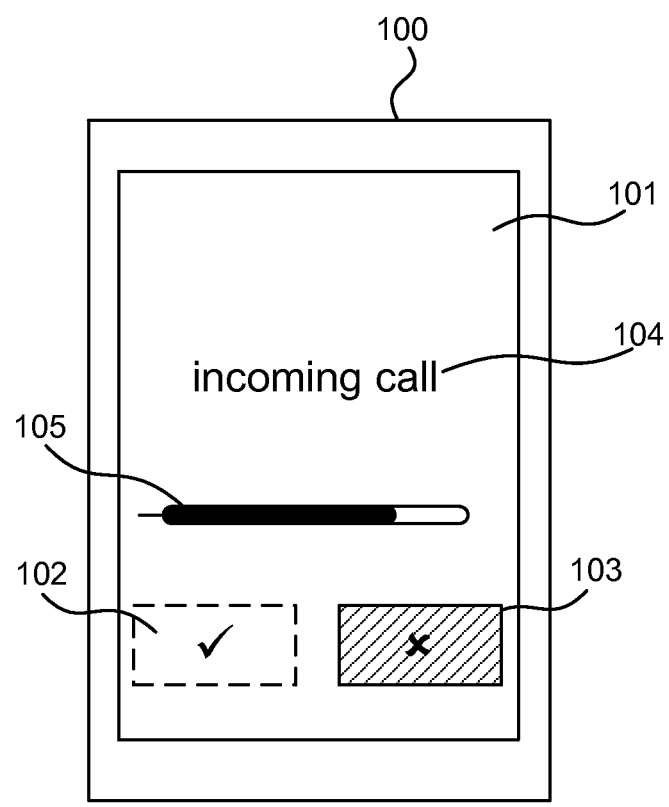
FIG. 4 illustrates the user interface of a mobile device presented in FIG. 2 later during the lag time after the other one of the options is selected by the second selection, according to an embodiment.

In FIG. 4, the mobile device 100 of FIG. 3 is depicted at a later point of time during the lag time. The lag time indicator bar 105 has progressed further, and the second option 103 is activated (depicted by hatching). Correspondingly, the first option 102 is displayed as cancelled, as illustrated by the dashed outline.

Depending on the configuration of the mobile device 100, the second selection may be performed immediately or at a later point of time. According to this selection in this case, the incoming telephone call will be rejected. In the embodiment of FIG. 4, a further lag time, during which the user might again re-select, is absent.

Figure 5:
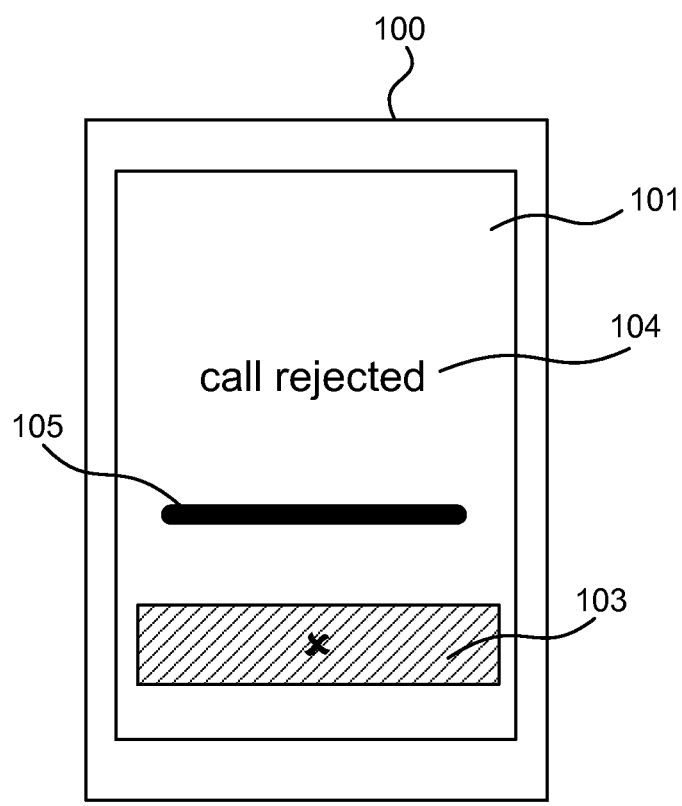
FIG. 5 illustrates the user interface of a mobile device presented in FIGS. 2 and 3 at the end of the lag time when the second selection is performed, according to an embodiment.

In FIG. 5, the mobile device 100 is depicted after the lag time has lapsed. The lag time indicator 105 has progressed to the end and only the selected second option 103 is visible at the user interface 101. For example, the first option 102 may not be feasible anymore. The incoming call display 104 shows the status of the call as rejected.

Several alternative courses of action can be taken when an incoming call is received by the mobile device 100 according to various embodiments. First, the user may, intentionally or unintentionally, accept an incoming call (first selection). During the lag time, the user has the opportunity to reconsider her choice. If the user decides to accept the incoming phone call, she has the alternative of waiting until the lag time has lapsed and the incoming phone call will be accepted after the lag time has lapsed. In such an embodiment might give the user more time to prepare for initiating the phone call. The user may, for example, bring the mobile device 100 to an appropriate position for the phone call or she may connect a head-set or a hands-free device. Alternatively, and if the mobile device 100 is suitably configured, the user can make the same selection again (second selection) for an earlier acceptance of the phone call. In other words, to accept an incoming phone call before the end of the lag time, the user may repeat the acceptance selection. For example, the user may tap a touchscreen for a second time at the same position or make the selection through voice command. For such an effect, the second selection may be performed within the lag time.

During the lag time, the user may decide to reject the call. Especially if the first selection of accepting the incoming phone call was accidental, the user might prefer to reject the phone call. The mobile device 100 according to the present examples allows the incoming phone call to be rejected without the first selection of accepting the incoming phone call to be performed. This might reduce confusion on the side of the caller, who avoids the situation of being momentarily connected and then having the phone call hung up. This again reduces the risk of the unwanted call to be repeated.

Second, the user may, again intentionally or unintentionally, reject an incoming call (first selection). Before the mobile device 100 signals the rejection signal to the network or to the system, the user has the opportunity to accept the incoming phone call by selecting the option of accepting the phone call. Consequently, before the call connection has been terminated in the system, there is an option to undo the undesired selection. Such an example might arise, for example, if the incoming phone call is received in a hectic situation and the importance of the phone call is realized only after a hasty rejection decision. For example, if it is impossible to call back because the phone call is coming from a hidden number or through a switchboard, the possibility of accepting the incoming phone call despite the initial rejection might be preferred. If the rejection decision is adhered to, the user may remain passive, and the rejection option will be signaled further after the end of the lag time. The phone call will thus not be connected. If the user prefers an earlier rejection of the phone call, the rejection option may be confirmed through making a corresponding second selection.

The likelihood of an accidental rejection or acceptance of a phone call is more likely in situations where the mobile device 100 is in a pocket, bag, purse or similar confined space when an incoming call is received. In such a situation, the user interface locking mechanism might be switched off or the unlocking key might be simplified. In such situations, especially with high ambient noise levels, the user might remain oblivious to the incoming phone call. The movement of the user, or the bag in which the mobile device 100 is kept, might lead to an acceptance or rejection selection without the knowledge of the user. Even if the user is aware of the incoming phone call, searching for the mobile device from a pocket, bag or purse, might lead to a selection being made.

In the above-mentioned cases, it might take longer for the user to be in the position to make the second selection. Thus, proximity sensors of mobile devices 100 may be used to detect the proximity of an object, which might be indicative of the above-described situations. If proximity of objet or objects is detected, the length of the lag time may be extended. This might give the user more time to realize she is being called to, or to find the mobile device 100 from the confined space in which it is kept. This, in turn, might reduce the possibility of unwanted rejections of phone calls, as well as phone calls being accepted and initiated unintentionally.

If the proximity of an object is detected by a proximity sensor, the length of the lag time may be extended by 100%, for example. Thus, a lag time of 3 seconds in the absence of a proximity signal will be changed to a lag time of 6 seconds if proximity of an object is detected. Alternatively, it is possible that the extension in the length of the lag time is smaller, for example 50%. The extension in the length of the lag time may be larger, for example 150% or 200%. In the first case, the length of a lag time would be extended from, for example from 4 seconds to 6 seconds. In the latter examples, the lag time of 2 seconds would be extended to 5 seconds or 6 seconds, respectively.

Embodiments can be envisaged in which a second lag time is initiated in response to the second selection. In such an embodiment, the second option would be performed only at the end of the second lag time. It is further possible that the optional second lag time would have a different pre-determined length depending on if the second selection is acceptance or rejection of the incoming phone call. It might be preferable to have a shorter or non-existing lag time in situations where the second selection is a rejection of the phone call compared to situations where the incoming phone call is accepted by making the second selection. Since when making an acceptance selection, the intention of the user is to establish a phone connection, it might be preferred to reduce the time during which the caller might hang up because of the assumption that the call is not being answered.

Figure 6:
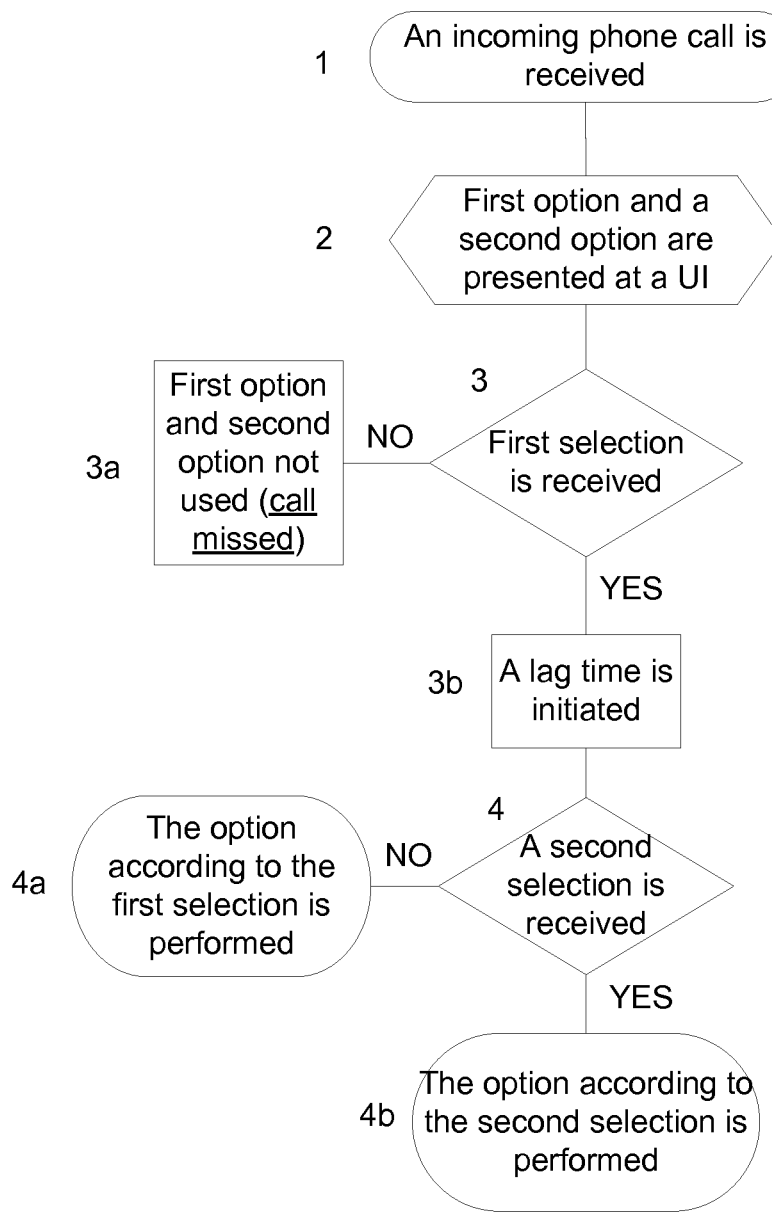
FIG. 6 is a schematic flow diagram of a method for rejecting or accepting a phone call according to an illustrative embodiment.

An embodiment of the method according to undoing undesired selection when receiving a call is illustrated in FIG. 6. In the method, an incoming phone call is received by a mobile device 100 (depicted as step 1 in FIG. 6). This leads to presenting a first option 102 and a second option 103 at a user interface of the mobile device 100 (step 2). At step 3, either a first selection remains absent or a first selection is received. In the first alternative (step 3a), neither of the first option 102 or the second option 103 is chosen. In such a situation, the incoming call will be missed. If a first selection is received (step 3b), a lag time of pre-determined length is initiated before performing the first selection (step 3b). At step 4, either a second selection remains absent or a second selection is received. In the absence of a second selection, the option 102, 103 according to the first selection is performed after the lag time has lapsed, for example at the end of the lag time or after the end of the lag time (step 4a). If a second selection is received, the option according to the second selection will be performed (step 4b), either immediately or later.

Figure 7:
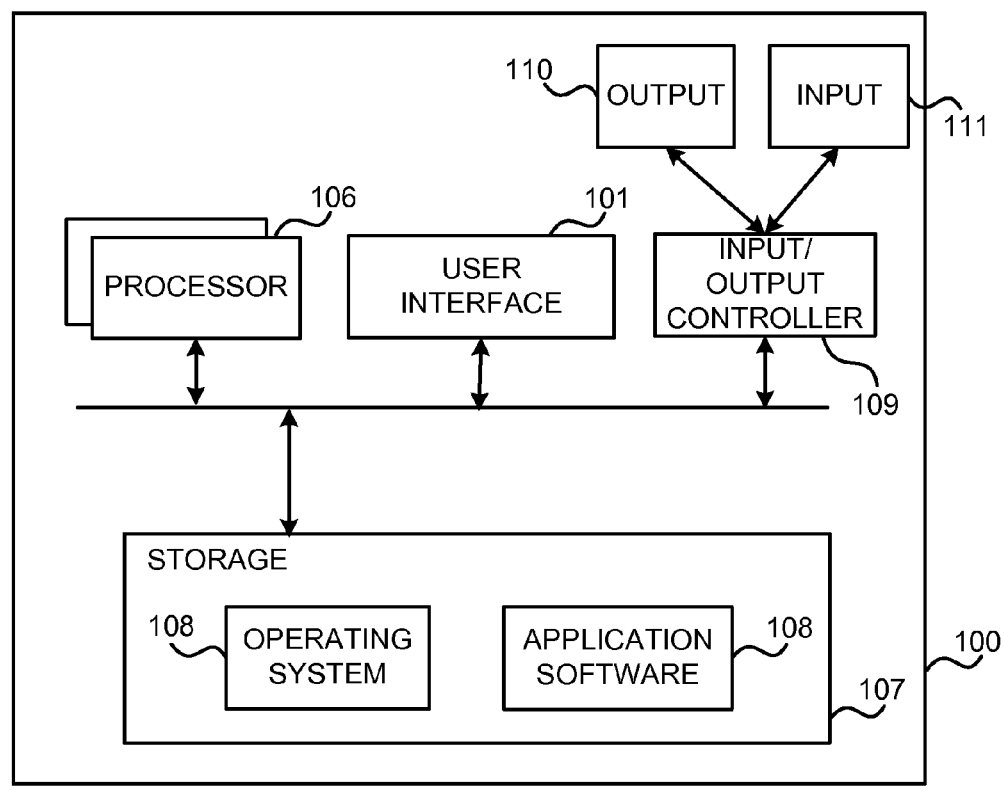
FIG. 7 presents a block diagram of a mobile device according to an illustrative embodiment.

FIG. 7 illustrates an embodiment of components of a mobile device 100 which may be implemented as any form of a computing and/or electronic device configured for receiving phone calls. The mobile device 100 is equipped with a processor 106 and a storage 107 comprising a set of instructions 108. The one or more processors 106 may be microprocessors, controllers or any other suitable type of processors for processing computer executable instructions to control the operation of the mobile device 100. The set of instructions 108 may comprise, for example, application software and platform software, such as an operating system to enable application software to be executed on the mobile device 100. When the set of instructions 108 is executed by the processor 106, the mobile device 100 is configured to perform the functions and operations described above, for example receive an incoming phone call, undo the first selection without disconnecting the call, etc. At least some of the embodiments are able to provide enhanced user interface 101 functionality.

Alternatively, or in addition, the functionality described herein can be performed, at least in part, by one or more hardware logic components.

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing-based device' each include different types of mobile devices or hand-held mobile devices, for example, in mobile phones, tablet computers, phablets, netbook computers, laptop computers, desktop computers, processor-enabled televisions, personal digital assistants (PDAs), touchscreen devices connected to any of the preceding devices, or any other computing device that is enabled to process phone calls.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the method described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

An embodiment relates to a device; comprising: a processor, a storage comprising a set of instructions, wherein the set of instructions, when executed by the processor, causes the device to: in response to received incoming phone call, present at a user interface of the device a first option of the call and a second option of the call; in response to a first selection between the first option and the second option, initiate a lag time of pre-determined length before performing the first selection; and in response to a second selection between the first option and the second option, perform the second selection.

Alternatively or in addition to, the set of instructions further causes the device to perform the second selection within the lag time, if the second selection is received during the lag time.

Alternatively or in addition to, the set of instructions further causes the device to maintain at the user interface the first and second options after the first selection for the duration of the lag time.

Alternatively or in addition to, the first option is rejecting an incoming phone call and the second option is accepting an incoming phone call.

Alternatively or in addition to, the first option is accepting an incoming phone call and the second option is rejecting an incoming phone call.

Alternatively or in addition to, the first selection and the second selection are actuated through sensitive areas on a touchscreen.

Alternatively or in addition to, the first selection and the second selection are gestures actuated through a natural user interface.

Alternatively or in addition to, the first selection is accepting an incoming phone call and the second selection is rejecting the incoming phone call.

Alternatively or in addition to, the first selection is rejecting an incoming phone call and the second selection is accepting the incoming phone call.

Alternatively or in addition to, the first selection is accepting an incoming phone call and the second selection is accepting the incoming phone call.

Alternatively or in addition to, the first selection is rejecting an incoming phone call and the second selection is rejecting the incoming phone call.

Alternatively or in addition to, the remaining lag time is displayed at the user interface.

Alternatively or in addition to, the device further comprises a proximity sensor to detect the proximity of an object and the length of the lag time is extended if proximity of an object is detected.

Alternatively or in addition to, the device comprises a mobile phone.

An embodiment relates to a mobile device, comprising: a processor, a storage comprising a set of instructions, wherein the set of instructions, when executed by the processor, causes the mobile device to: receive an event at the mobile device; present at a user interface of the mobile device a first option of the event and a second option of the event; in response to a first selection between the first option or the second option, initiate a lag time of pre-determined length before performing the first selection; and in the absence of a second selection during the lag time, the first selection is performed at the end of the lag time.

Alternatively or in addition to, the set of instructions further causes the device to perform the first selected option, if no selection is received during lag time.

An embodiment relates to a method, comprising: receiving an incoming phone call on a device; presenting at a user interface of the device a first option of the call and a second option of the call; in response to a first selection between the first option and the second option, initiating a lag time of pre-determined length before performing the first selection; and in response to a second selection between the first option and the second option, performing the second selection.

Alternatively or in addition to, the second selection is performed within the lag time, if the second selection is received during the lag time.

Alternatively or in addition to, maintaining at the user interface the first and second options after the first selection for the duration of the lag time.

Alternatively or in addition to, in the absence of a second selection during the lag time, the first selection is performed at the end of the lag time.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
a processor; and
a storage comprising a set of instructions, wherein the set of instructions, when executed by the processor, causes the device to:
in response to a received incoming phone call, present at a user interface of the device a first option of the call and a second option of the call;
in response to a first selection between the first option and the second option, initiate a lag time of pre-determined length before performing the first selection; and
in response to a second selection between the first option and the second option before the lag time has ended, perform the second selection.

2. The device of claim 1, wherein the set of instructions further causes the device to perform the second selection within the lag time, if the second selection is received during the lag time.

3. The device of claim 1, wherein the set of instructions further causes the device to maintain at the user interface the first and second options after the first selection for a duration of the lag time.

4. The device according to claim 1, wherein the first option is rejecting the incoming phone call and the second option is accepting the incoming phone call.

5. The device according to claim 1, wherein the first option is accepting the incoming phone call and the second option is rejecting he incoming phone call.

6. The device according to claim 1, wherein the first selection and the second section are actuated through sensitive areas on a touchscreen.

7. The device according to claim 1, wherein the first selection and the second selection are gestures actuated through a natural user interface.

8. The device according to claim 1, wherein the first selection is accepting an incoming phone call and the second selection is rejecting the incoming phone call.

9. The device according to claim 1, wherein the first selection is rejecting the incoming phone call and the second selection is accepting the incoming phone call.

10. The device according to claim 1, wherein the first selection is accepting the incoming phone call and the second selection is accepting the incoming phone call.

11. The device according to claim 1, wherein the first selection is rejecting an incoming phone call and the second selection is rejecting the incoming phone call.

12. The device according to claim 1, wherein a remaining lag time is displayed at the user interface.

13. The device according to claim 1, wherein the device further comprises a proximity sensor to detect a proximity of an object, wherein a length of the lag time is extended if proximity of an object is detected.

14. The device of claim 1, wherein the device comprises a mobile phone.

15. A mobile device, comprising:
a processor; and
a storage comprising a set of instructions, wherein the set of instructions, when executed by the processor, causes the mobile device to:
receive an event at the mobile device;
present at a user interface of the mobile device a first option of the event and a second option of the event;
in response to a first selection between the first option and the second option, initiate a lag time of pre-determined length before performing the first selection; and in response to a second selection between the first option and the second option before the lag time has ended, the second selection is performed.

16. The mobile device of claim 15, wherein the set of instructions further causes the device to perform the first selected option, if no selection is received during the lag time.

17. A method, comprising:
receiving an incoming phone call on a device;
presenting at a user interface of the device a first option of the call and a second option of the call;
in response to a first selection between the first option and the second option, initiating a lag time of pre-determined length before performing the first selection; and
in response to a second selection between the first option and the second option before the lag time has ended, performing the second selection.

18. The method according to claim 17, wherein the second section is performed within the lag time, if the second selection is received during the lag time.

19. The method of claim 17, further including maintain at the user interface the first and second options after the first selection for a duration of the lag time.

20. The method according to claim 17, wherein in the absence of a second selection during the lag time, the first selection is performed at an end of the lag time.

* * * * *